United States Patent [19]

Shimasaki et al.

[11] Patent Number: 5,791,140
[45] Date of Patent: Aug. 11, 1998

[54] EXHAUST GAS-PURIFYING SYSTEM FOR INTERNAL COMBUSTION ENGINES

[75] Inventors: Yuichi Shimasaki; Akihisa Saito; Tetsu Teshirogi; Takuya Aoki; Hiroaki Kato; Takashi Komatsuda; Hideo Furumoto, all of Wako; Takayoshi Nakayama, Haga-gun, all of Japan

[73] Assignee: Honda Giken Kogyo K.K., Tokyo, Japan

[21] Appl. No.: 634,507

[22] Filed: Apr. 18, 1996

[30] Foreign Application Priority Data

Apr. 21, 1995 [JP] Japan ................. 7-120648

[51] Int. Cl.⁶ .................................................. F01N 3/20
[52] U.S. Cl. ........................... 60/284; 60/286; 60/300
[58] Field of Search ................................ 60/284, 286, 300

[56] References Cited

U.S. PATENT DOCUMENTS 5,390,493  2/1995  Fujishita et al. .................... 60/300
5,404,720  4/1995  Laing ................................. 60/300
5,503,804  4/1996  Fujishita et al. .................... 60/300
5,539,286  7/1996  Brinkmeyer et al. ................ 60/300

FOREIGN PATENT DOCUMENTS 4-279718  10/1992  Japan.

Primary Examiner—Sheldon Richter
Attorney, Agent, or Firm—Arthur L. Lessler

[57] ABSTRACT

An exhaust gas-purifying system for an internal combustion engine includes an alternator driven by the engine. A regulator controls voltage generated by the alternator. An electrically-heated catalyzer is arranged in the exhaust system of the engine and connected to the alternator to be electrically heated by electric power generated by the alternator. An ECU controls the regulator to control the voltage generated by the alternator and supplied to the electrically-heated catalyzer, according to operating conditions of the engine detected by sensors such as an engine coolant temperature sensor and an intake air temperature sensor.

6 Claims, 6 Drawing Sheets

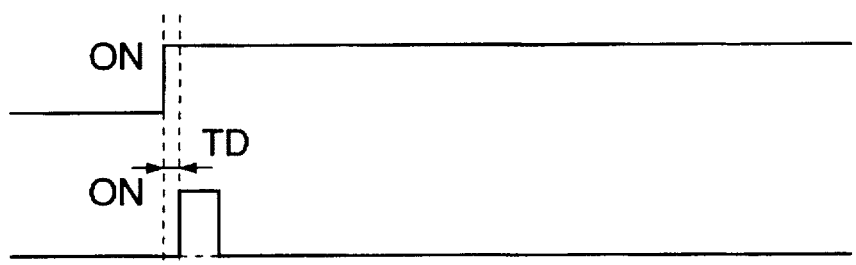
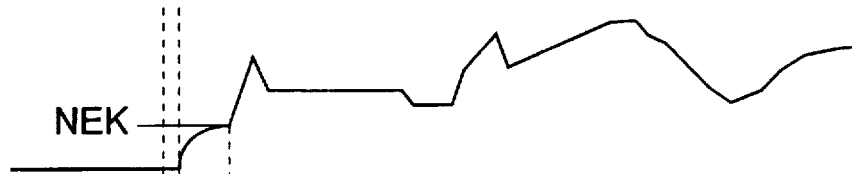
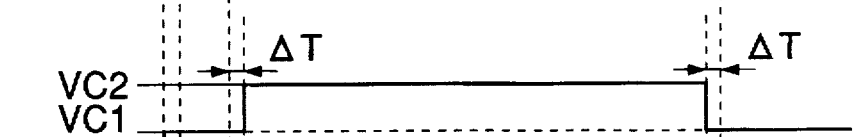
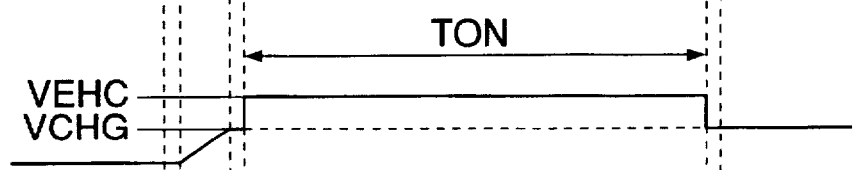
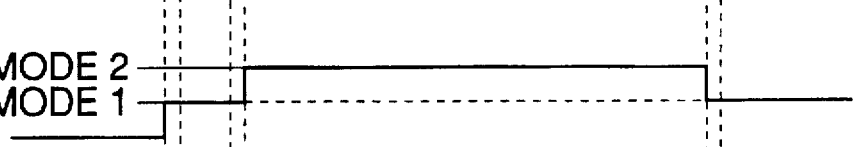
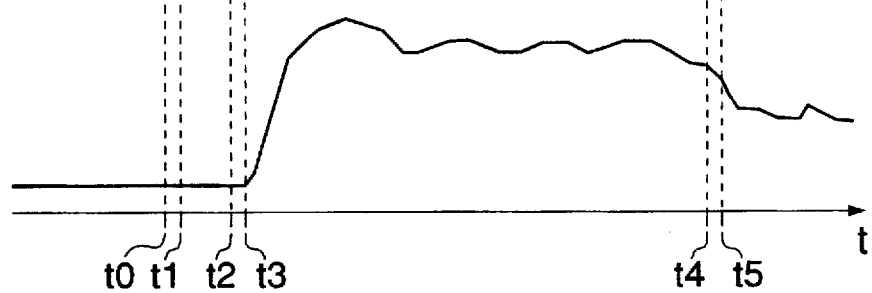

EXHAUST GAS-PURIFYING SYSTEM FOR INTERNAL COMBUSTION ENGINES

BACKGROUND OF THE INVENTION

1. Field of the Invention

This invention relates to an exhaust gas-purifying system for internal combustion engines, and more particularly to an exhaust gas-purifying system of this kind which has an electrically-heated catalyzer.

2. Prior Art

A catalyzer employed in an internal combustion engine for purifying exhaust gases emitted from the engine does not become activated until a considerable time period elapses after the start of the engine when the engine is started in a cold state. To accelerate the activation of the catalyzer, there is conventionally known an electrically-heated catalyzer which is electrically heated to become promptly activated.

A method of controlling energization of such an electrically-heated catalyzer is conventionally known, for example, from Japanese Laid-Open Patent Publication (Kokai) No. 4-279718, which sets an energization time period according to a detected engine temperature or a like parameter, and causes electric power to be supplied from a battery to the catalyzer over the set energization time period to increase the catalyzer temperature to a desired value.

However, the conventionally known method can only control the energization time period over which the catalyzer is supplied with electric power from the battery. As a result, when not so large an amount of electric power as in engine starting in a cold state is required to be supplied to the catalyzer (heater), e.g. during so-called hot-restarting of the engine, it is difficult to accurately control energy (integrated electric power amount) supplied to the catalyzer by the conventionally known method. That is, the conventionally known method tends to supply more energy to the catalyzer than required. Further, supply of too much energy to the catalyzer can cause overheating of the catalyzer, resulting in degraded durability of the catalyzer.

Besides, according to the conventional method, electric power is directly supplied to the catalyzer from the battery without changing the voltage, so that a large amount of current has to be supplied to the catalyzer (heater), which necessitates employment of peripheral circuit parts (switches and electric lines) having large current ratings.

SUMMARY OF THE INVENTION

It is the object of the invention to provide an exhaust gas-purifying system for internal combustion engines, which is capable of accurately controlling electric power supplied to the electrically-heated catalyzer as well as lowering electric current supplied thereto, to thereby curtail costs involved in employing peripheral circuit parts of the catalyzer.

To attain the above object, the present invention provides an exhaust gas-purifying system for an internal combustion engine having an exhaust system, comprising:

an alternator driven by the engine, for generating electric power;

regulator means for controlling voltage generated by the alternator;

an electrically-heated catalyzer arranged in the exhaust system of the engine, the catalyzer being connected to the alternator to be electrically heated by the electric power generated by the alternator;

operating condition-detecting means for detecting operating conditions of the engine; and regulator control means for controlling the regulator means to control the voltage generated by the alternator and supplied to the electrically-heated catalyzer, according to the operating conditions of the engine detected by the operating condition-detecting means.

Preferably, the regulator control means further controls a time period over which the voltage generated by the alternator is supplied to the electrically-heated catalyzer, according to the operating conditions of the engine detected by the operating condition-detecting means.

More preferably, the operating condition-detecting means detects at least one of temperature of the engine, temperature of intake air supplied to the engine, and temperature of the exhaust system.

Also preferably, the regulator control means controls the regulator means such that the voltage generated by the alternator is decreased as the at least one of the temperature of the engine, the temperature of the intake air, and the temperature of the exhaust system is higher.

Preferably, the regulator control means controls the regulator means such that the time period over which the voltage generated by the alternator is supplied to the electrically-heated catalyzer is decreased as the at least one of the temperature of the engine, the temperature of the intake air, and the temperature of the exhaust system is higher.

Advantageously, the regulator control means controls the regulator means such that the voltage generated by the alternator is higher than output voltage from a battery provided for the engine.

The above and other objects, features, and advantages of the invention will be more apparent from the following detailed description taken in conjunction with the accompanying drawings.

BRIEF DESCRIPTION OF THE DRAWINGS

FIGS. 6A to 6I collectively form a timing chart showing the relationship between operations of essential component parts and changes in control parameter values, wherein FIG. 6A shows the operation of an IG switch of the engine;

FIG. 6B shows the operation of a starter of the engine;

FIG. 6C shows changes in engine rotational speed NE;

FIG. 6D shows a signal indicative of a determination as to complete explosion of the engine;

FIG. 6E shows a changeover control signal for a switch appearing in FIG. 2;

FIG. 6F shows a change in voltage VC supplied to a regulator appearing in FIG. 2;

FIG. 6G shows a change in output voltage VALT from an alternator appearing in FIG. 2;

FIG. 6H shows a change in generation mode of the alternator; and

FIG. 6I shows changes in the temperature of the electrically-heated catalyzer.

DETAILED DESCRIPTION

The invention will now be described in detail with reference to the drawings showing an embodiment thereof.

Figure 1:
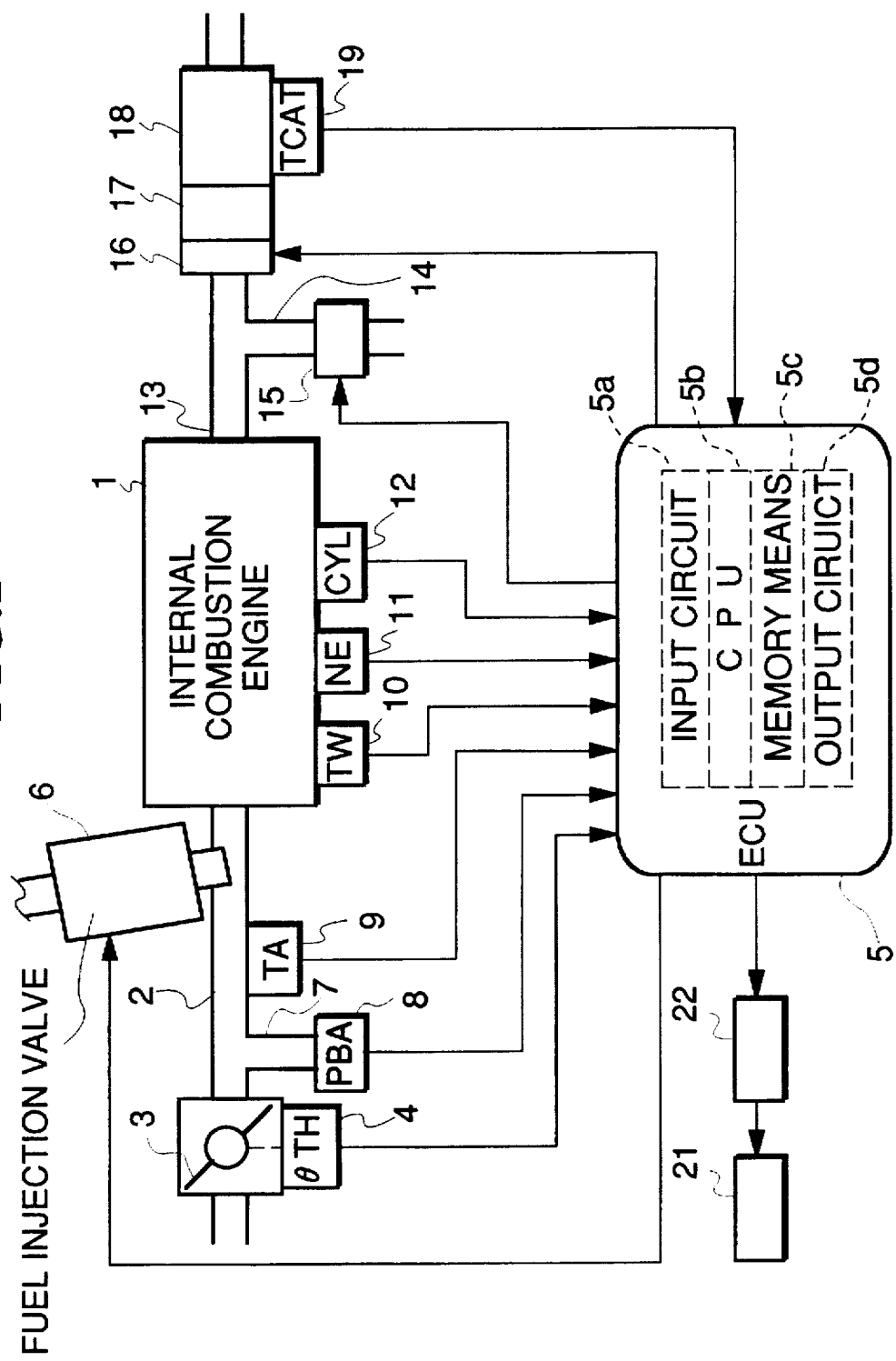
FIG. 1 is a block diagram schematically showing the whole arrangement of an internal combustion engine and an exhaust gas-purifying system therefor, according to an embodiment of the invention.

Referring first to FIG. 1, there is illustrated the whole arrangement of an internal combustion engine and an exhaust gas-purifying system therefor, according to an embodiment of the invention. In the figure, reference numeral 1 designates an internal combustion engine (hereinafter referred to as "the engine"), which has an intake pipe 2 connected to the cylinder block of the engine 1, in which is arranged a throttle valve 3. A throttle valve opening (θTH) sensor 4 is connected to the throttle valve 3, for generating an electric signal indicative of the sensed throttle valve opening θTH to an electronic control unit (hereinafter referred to as "the ECU") 5.

Fuel injection valves 6, only one of which is shown, are each provided for each cylinder and arranged in the intake pipe 2 at a location intermediate between the engine 1 and the throttle valve 3 and slightly upstream of an intake valve, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is connected via a conduit 7 to the intake pipe 2 at a location immediately downstream of the throttle valve 3, for sensing absolute pressure PBA within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1, which is filled with coolant, for supplying an electric signal indicative of the sensed engine coolant temperature TW to the ECU 5.

An engine rotational speed (NE) sensor 11 and a cylinder-discriminating (CYL) sensor 12 are arranged in facing relation to a camshaft or a crankshaft of the engine 1, neither of which is shown. The NE sensor 11 generates a signal pulse (hereinafter referred to as "a TDC signal pulse") at each of predetermined crank angles (e.g. whenever the crankshaft rotates through 180 degrees when the engine is of a 4-cylinder type) which each correspond to a predetermined crank angle before a top dead point (TDC) of each cylinder corresponding to the start of the suction stroke of the cylinder, while the CYL sensor 12 generates a signal pulse at a predetermined crank angle of a particular cylinder of the engine, both of the pulses being supplied to the ECU 5.

An electrically-heated catalyzer (hereinafter referred to as "the EHC") 16, a starting catalyzer 17, and a three-way catalyzer 18 are arranged in an exhaust pipe 13 connected to the engine 1 in this order from an upstream side thereof, for purifying noxious components in exhaust gases from the engine, such HC, CO, and NOx. The starting catalyzer 17 is a small-sized catalyzer provided mainly for purifying exhaust gases emitted from the engine immediately after starting thereof.

Extending from the exhaust pipe 13 is a passage 14 for supplying secondary air into the exhaust pipe 13 at a location upstream of the EHC 16, in which is arranged an air pump 15.

The EHC 16 and the air pump 15 are electrically connected to the ECU 5 to have their operations controlled by signals from the ECU 5. Further, a catalyst temperature sensor 19 is connected to the three-way catalyzer 18, for supplying an electric signal indicative of the sensed catalyzer temperature TCAT to the ECU 5.

Further, an alternator 21, which is driven by the engine 1, is connected to the engine 1 via a regulator 22 such that voltage generated by the alternator 21 is controlled by a signal from the ECU 5.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so fourth, a central processing unit (hereinafter referred to as "the CPU") 5b, memory means 5c storing various operational programs which are executed by the CPU 5b and for storing results of calculations therefrom, etc., and an output circuit 5d which delivers control signals to the fuel injection valves 6, air pump 15, EHC 16, regulator 22, etc., for driving the same.

The CPU 5b calculates an energization time period TON of the ECH 16 and voltage VEHC supplied thereto in response to the signals from the TW and TA sensors, to generate control signals based on results of the calculation.

Figure 2:
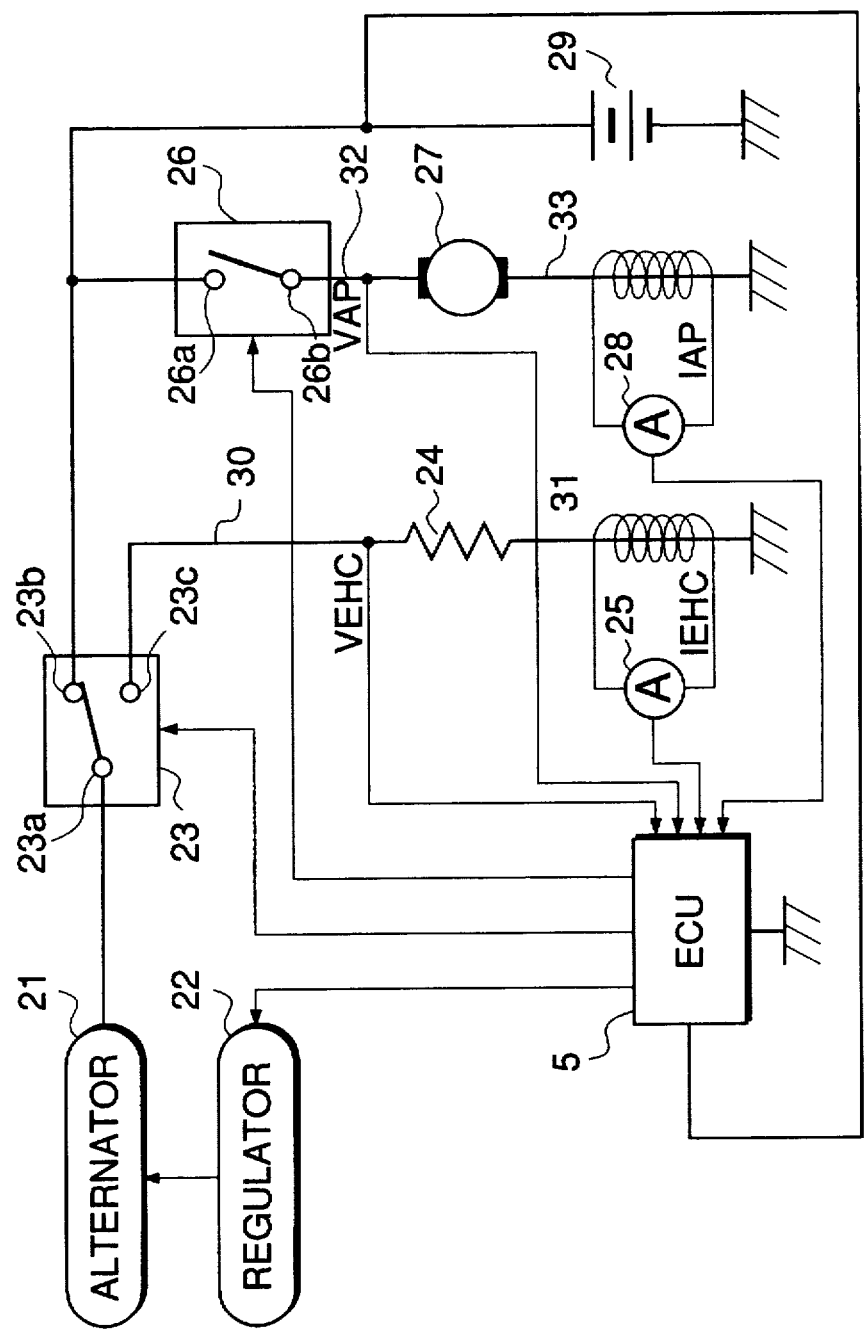
FIG. 2 is a circuit diagram showing the connection of a heater resistance of an electrically-heated catalyzer appearing in FIG. 2 and its related or peripheral circuit parts.

FIG. 2 shows a circuit formed by the ECU 5, the alternator 21, the regulator 22, a heater resistance 24 of the EHC 16, a motor 27 of the air pump 15, and a battery 29 of the engine 1. The battery 29 supplies its output voltage as operating voltage to the ECU, electrical load devices, not shown, of the engine, etc. The ECH 16 employed in the present embodiment also acts as a heater, that is, it has a catalyst body thereof supplied with current to be heated thereby. The electrical resistance of the catalyst body is represented as the heater resistance 24.

The alternator 21 has an output thereof connected to a terminal 23a of a changeover switch 23 which has another terminal 23c connected to one end of the heater resistance 24 through a connecting line 30. The other end of the heater resistance 24 is grounded through a connecting line 31. An EHC electric current sensor 25 is provided on the connecting line 31 to detect heater current IEHC supplied to the EHC 16.

The changeover switch 23 has a further terminal 23b connected to a positive electrode of the battery 29 as well as to a terminal 26a of an ON/OFF switch 26 which has another terminal 26b connected to one end of a motor 27 through a connecting line 32. The other end of the motor 27 is grounded through a connecting line 33 on which is provided a pump current sensor 28 for detecting current IAP supplied to the air pump 15.

The battery 29 has its negative electrode grounded and its positive electrode connected to the ECU 5.

The switches 23 and 26 are electrically connected to the ECU 5 to have their switching operations controlled by signals from the ECU 5. The switches 23 and 26 are normally in positions shown in FIG. 2 in which the terminals 23a and 23b of the switches 23 are connected to each other while the switch 26 is open with its terminals 26a, 26b disconnected from each other. The switches 23, 26 are controlled to be changed in position from their respective illustrated positions immediately after starting of the engine 1, if required. Further, the connecting lines 30 and 32 are electrically connected to the ECU 5 so that the ECU 5 detects voltage VEHC applied to the EHC 16 and voltage VAP applied to the air pump 15. Also, the electric current sensors 25 and 28 are connected to the ECU 5, for supplying signals indicative of the respective detected electric current values to the ECU 5. These current sensors 25 and 28 are provided for detecting abnormalities in the circuit, such as a disconnection.

Figure 3:
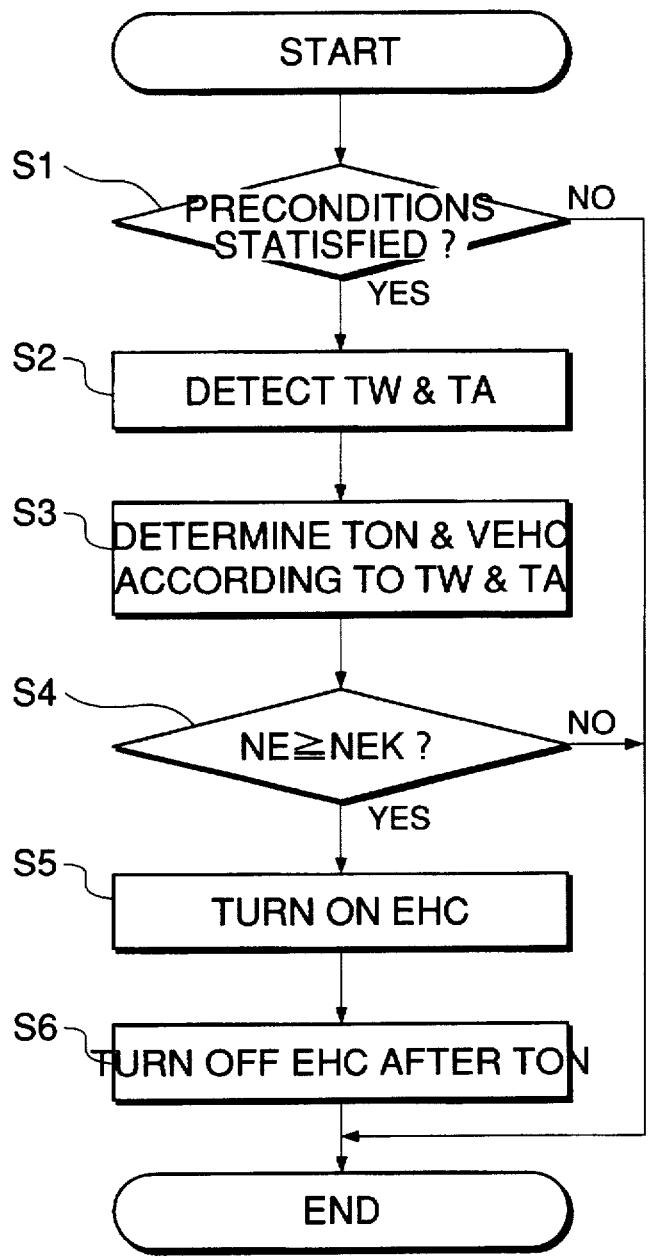
FIG. 3 is a flowchart showing a program for controlling voltage supplied to the electrically-heated and an energization time period of the same.

FIG. 3 shows a program for controlling supply of electric power to the heater resistance 24.

First, at a step S1, it is determined whether or not preconditions for carrying out the control of the electric power supply are satisfied, e.g. whether or not an ignition switch of the engine has been turned on. If the preconditions are not satisfied, the present routine is immediately terminated, whereas if the preconditions are satisfied, i.e. if the ignition switch has been turned on, detected values of the engine coolant temperature TW and the intake air temperature TA are read in at a step S2. Then, at a step S3, a TON map and a VEHC map which are set according to the TW and TA values are retrieved, to determine the energization time period (EHC-ON time period) TON of the heater resistance 24 and the voltage VEHC to be supplied to the EHC 16.

Figure 4A:
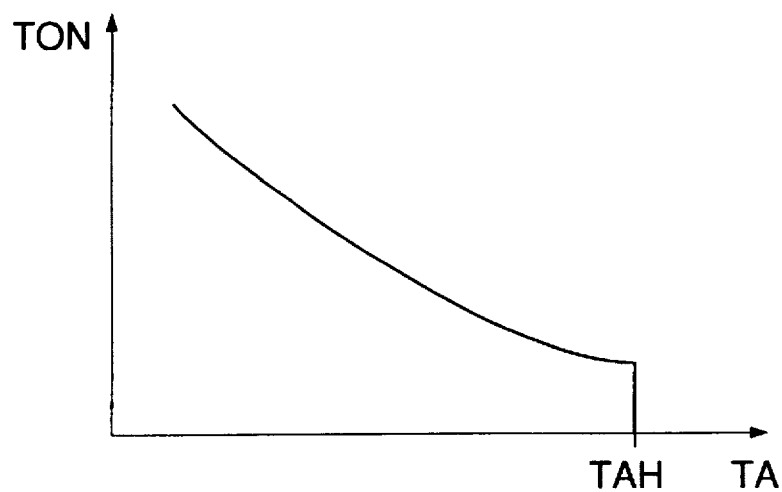
FIG. 4A is a graph showing the relationship between the energization time period TON of the catalyzer and intake air temperature TA.
Figure 4B:
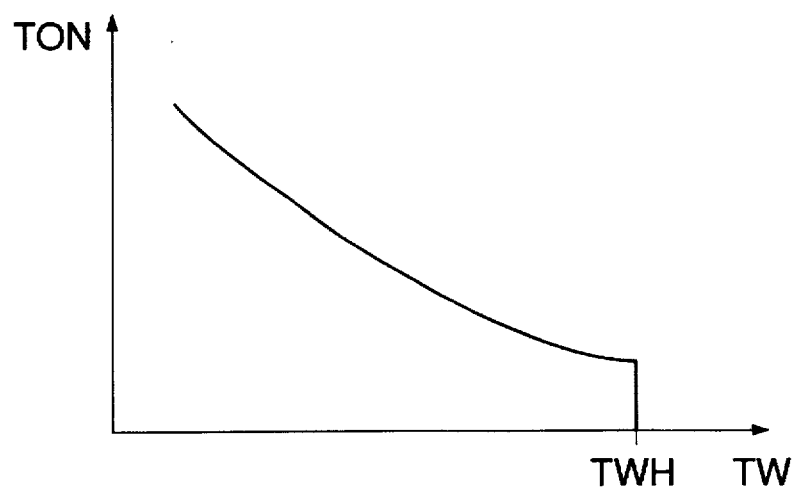
FIG. 4B is a graph showing the relationship between the TON value and engine coolant temperature TW.
Figure 5A:
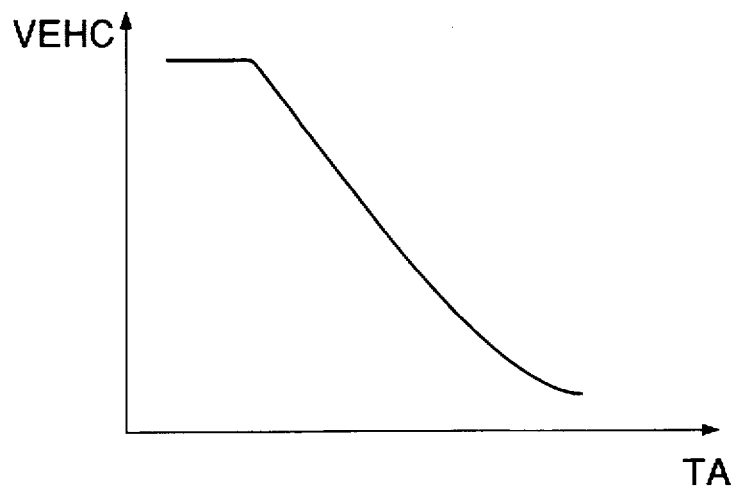
FIG. 5A is a graph showing the relationship between voltage VEHC supplied to the catalyzer and the intake air temperature TA.
Figure 5B:
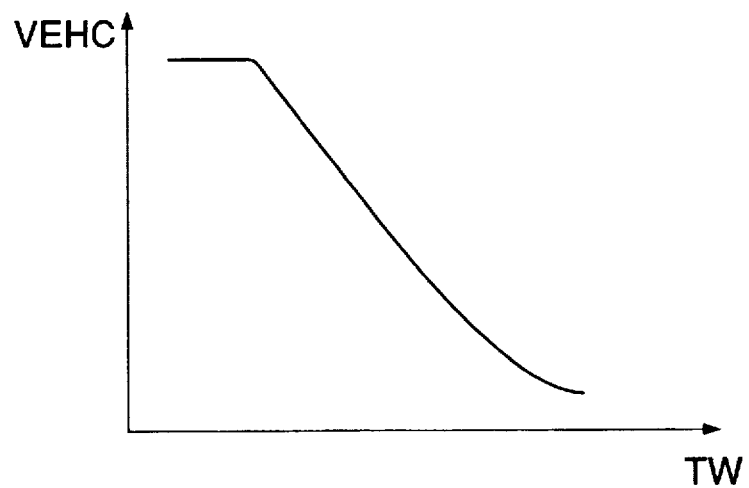
FIG. 5B is a graph showing the relationship between the VEHC value and the engine coolant temperature TW.
Figure 5C:
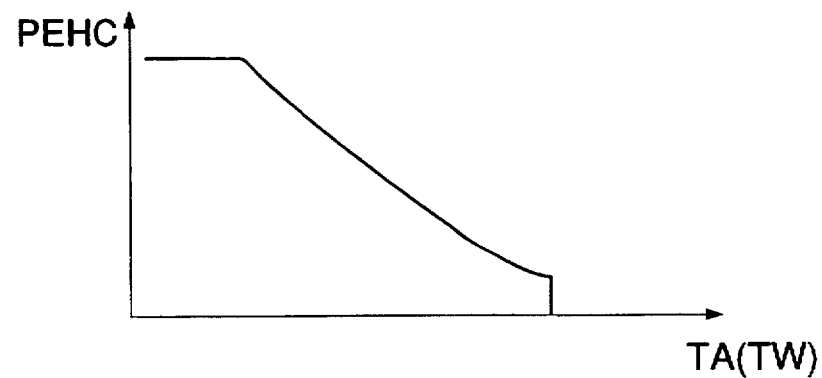
FIG. 5C is a graph showing the relationship between an amount of electric power PEHC supplied to the catalyzer and the intake air temperature TA or the engine coolant temperature TW.

The TON map is set based on the relationships shown in FIGS. 4A and 4B. More specifically, the TON value is decreased as the intake air temperature TA is higher, as shown in FIG. 4A, and as the engine coolant temperature TW is higher, as shown in FIG. 4B. When the intake air temperature TA and the engine coolant temperature TW exceed predetermined values TAH and TWH, respectively, energization of the heater resistance 24 is not carried out, and therefore the TON value is set to 0. The TON map contains map values empirically determined by the use of an equation of TON=$f_1$ (TA) (TW) based on the relationships shown in FIGS. 4A and 4B. The VEHC map is set based on the relationships shown in FIGS. 5A and 5B. More specifically, the VEHC value is decreased as the intake air temperature TA is higher, as shown in FIG. 5A, and the engine coolant temperature TA is higher, as shown in FIG. 5B. The VEHC map contains map values empirically determined by the use of an equation of VEHC=$f_2$(TA) (TW) based on the relationships shown in FIGS. 5A and 5B. By thus controlling the VEHC value, electric power PEHC supplied to the EHC 16 is controlled as shown in FIG. 5C. Advantageously, the VEHC value is set to a value considerably higher than output voltage from the battery 29, e.g. to 30 volts when the engine is started in a cold state. By virtue of this setting, current supplied to the resistance 24 can be reduced to approximately a half of that supplied to the same from the battery 29.

At the following step S4, it is determined whether or not the engine rotational speed NE is higher than a predetermined value NEK (e.g. 400 rpm) for determining whether or not complete explosion of the engine has taken place. If NE<NEK holds, the present routine is immediately terminated. On the other hand, if NE≧NEK holds, the program proceeds to a step S5, wherein the changeover switch 23 is switched to the terminal 23c side, and at the same time alternator output voltage VALT is controlled so as to be equal to the VEHC value determined at the step S3, whereby electric power having the thus controlled alternator output voltage VALT is supplied to the EHC 16. Thereafter, when the energization time period TON has elapsed, the alternator output voltage VALT is lowered to ordinary output voltage VCHG (e.g. 14.5 volts) and the changeover switch 23 is switched to the terminal 23b side at a step S6.

As described hereinabove, according to the present embodiment, not only the energization time period TON of the EHC 16 but also the voltage VEHC supplied to the EHC 16 is controlled according to the intake air temperature TA and the engine coolant temperature TW. As a result, energy (integrated electric power amount) supplied to the EHC 16 can be accurately controlled, to thereby prevent or reduce waste of energy. Further, as mentioned above, the EHC voltage VEHC is set to a value higher than the battery voltage, e.g. to 30 volts, and accordingly the supply current is decreased to thereby curtail costs involved in employing peripheral circuit parts of the EHC 16. Besides, by setting the output voltage from the alternator 21 to a high value such as 30 volts, the generating efficiency of the alternator 21 can be increased.

The preconditions determined at the step S1 in FIG. 3 may be satisfied when the ignition switch is turned on and at the same time the engine coolant temperature TW and/or the catalyzer temperature TCAT is below a predetermined value.

FIGS. 6A to 6I collectively form a timing chart showing the relationship between operations of essential component parts and changes in control parameter values. When the ignition switch is turned on at a time point to (FIG. 6A), the ECU 5 sets regulator control voltage VC to a predetermined value VC1 for ordinary operation of the engine (FIG. 6F), and sets the alternator generation mode to a mode 1 (FIG. 6H). When a starter of the engine is started at a time point t1 at which a predetermined time period TD (time period required for turning a starter key, e.g. approximately 0.1 sec) has elapsed from the time point t0 (FIG. 6B), rotation of the engine is started (FIG. 6C), and then the alternator output voltage VALT increases to the battery-charging voltage VCHG with an increase in the engine rotational speed NE (FIG. 6G).

When the engine rotational speed NE has reached the predetermined value NEK for determining complete explosion of the engine at a time point t2 (FIG. 6C), the ECU 5 determines that the engine has been brought into a complete explosion state (FIG. 6C), and delivers a changeover control signal to the switch 23 to switch the same from the terminal 23b side to the terminal 23c side (FIG. 6E). Then, the regulator control voltage VC is set to EHC control voltage VC2 such that the alternator output voltage VALT becomes equal to the VEHC value determined at the step S5 in FIG. 3, at a time point t3 after the lapse of a predetermined time period ΔT required for completion of switching of the switch 23 (time period from the time the changeover control signal is generated to the time switching of the switch is actually completed, e.g. approximately 0.25 sec) from the time point t2 (FIG. 6F), whereby the alternator generation mode is shifted to a mode 2 (FIG. 6H). Thus, the alternator output voltage VALT is increased to the value VEHC (FIG. 6G), whereby the temperature of the EHC 16 starts to increase (FIG. 6I). The EHC control voltage VC2 is controlled in a feedback manner such that the detected voltage supplied to the EHC 16 (voltage on the connecting line 30 in FIG. 2) becomes equal to the determined VEHC value.

Then, at a time point t4 at which the time period TON determined at the step S3 in FIG. 3 has elapsed, the regulator control voltage VC is returned to the VCHG value (FIG. 6F), whereby the generation mode is returned to the mode 1 (FIG. 6H). Thus, the alternator output voltage VALT becomes equal to the ordinary battery-charging voltage VCHG (FIG. 6G). The ECU 5 generates the changeover control signal to the switch 23 to switch the same from the terminal 23c side to the terminal 23b side at a time point t5 after the lapse of the time period ΔT from the time point t4, followed by terminating the electric power supply control carried out at the start of the engine (FIG. 6E).

According to the present embodiment, the motor 27 of the air pump 15 is operated in synchronism with operation of the EHC 16.

Although in the above described embodiment, the voltage supplied to the EHC 16 and the energization time period of the same are both determined according to the engine coolant temperature TW and the intake air temperature TA, this is not limitative. Alternatively, the energization time period may be set to a fixed value. Further, in place of either the engine coolant temperature TW or the intake air temperature TA, the catalyzer temperature TCAT detected by the catalyst temperature sensor 19 may be employed for determination of the voltage VECH and the energization time period TON. Still further, the voltage VECH and the energization time period TON may be determined according to one or two of the engine coolant temperature TW, the intake air temperature TA, and the catalyzer temperature TCAT. Moreover, in place of the catalyzer temperature TCAT, a parameter representative of the temperature of the exhaust system such as the temperature of exhaust gases may be employed.

As described above in detail, according to the invention, electric power is supplied from an alternator to an electrically-heated catalyzer arranged in the exhaust system of an internal combustion engine, and voltage generated by the alternator is controlled according to detected operating conditions of the engine. As a result, energy (integrated electric power amount) supplied to the electrically-heated catalyzer can be accurately controlled, to thereby prevent or reduce waste of energy. Further, the voltage generated by the alternator is set to a value higher than the battery voltage. As a result, supply of a smaller amount of current to the electrically-heated catalyzer suffices to thereby curtail costs involved in employing peripheral component parts of the electrically-heated catalyzer.

What is claimed is:

1. An exhaust gas-purifying system for an internal combustion engine having an exhaust system, comprising:

an alternator driven by said engine, for generating electric power;

regulator means for controlling voltage generated by said alternator;

an electrically-heated catalyzer arranged in said exhaust system of said engine, said catalyzer being connected to said alternator to be electrically heated by said electric power generated by said alternator;

operating condition-detecting means for detecting temperature of said engine and temperature of intake air supplied to said engine; and regulator control means for controlling said regulator means to control said voltage generated by said alternator and supplied to said electrically-heated catalyzer, according to said operating conditions of said engine detected by said operating condition-detecting means.

2. An exhaust gas-purifying system as claimed in claim 1, wherein said regulator control means further controls a time period over which said voltage generated by said alternator is supplied to said electrically-heated catalyzer, according to said operating conditions of said engine detected by said operating condition-detecting means.

3. An exhaust gas-purifying system as claimed in claim 1 or 2, wherein said operating condition-detecting means further detects temperature of said exhaust system.

4. An exhaust gas-purifying system as claimed in claim 3, wherein said regulator control means controls said regulator means such that said voltage generated by said alternator is decreased as said at least one of said temperature of said engine, said temperature of said intake air, and said temperature of said exhaust system is higher.

5. An exhaust gas-purifying system as claimed in claim 3, wherein said regulator control means controls said regulator means such that said time period over which said voltage generated by said alternator is supplied to said electrically-heated catalyzer is decreased as said at least one of said temperature of said engine, said temperature of said intake air, and said temperature of said exhaust system is higher.

6. An exhaust gas-purifying system as claimed in claim 1, wherein said engine has a battery, and said regulator control means controls said regulator means such that said voltage generated by said alternator is higher than output voltage from said battery.

* * * * *